United States Patent Office 2,925,444
Patented Feb. 16, 1960

2,925,444

PROCESS FOR PREPARATION OF METHYLENE-BISPHENOLS

Max Levine, Cleveland Heights, and Samuel C. Temin, Cleveland, Ohio, assignors to Industrial Rayon Corporation, Cleveland, Ohio, a corporation of Delaware No Drawing. Application February 19, 1958
Serial No. 716,050

3 Claims. (Cl. 260—619)

This invention relates to the preparation of monomers useful in the synthesis of polyesters and particularly polycarbonates. More specifically this invention is concerned with the catalytic reduction of bis-(hydroxyphenyl) ketones to their corresponding bis-(hydroxyphenyl) methanes.

A considerable number of polycarbonates and interpolycarbonates have been suggested as polymers which may be formed into useful shaped articles, such as, fibers, filaments, films and the like. Generally, these polycarbonates are synthesized from a bis-(hydroxyphenyl) alkane or 4-4'dioxy-diphenyl alkane either by alcoholysis with dialkyl carbonates or by reaction of the former with phosgene. In either synthesis the starting materials employed are bis-(hydroxy-phenyl) alkanes. Of the large number of bis-(hydroxyphenyl) alkanes from which the starting materials may be selected, particularly useful polymers result from using a bis-(hydroxyphenyl) methane.

Generally, diphenolic methanes are synthesized by the condensation of phenols with carbonyl compounds. Thus, compounds of the type:

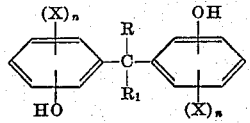

wherein R is hydrogen or an alkyl radical, $R_1$ is hydrogen, an alkyl, aryl, or cycloaliphatic radical, X is hydrogen or an alkyl radical and $n$ represents a positive integer from 0 to 2, are prepared by chemically (acid or base) catalyzed condensations of aldehydes and ketones with substituted or unsubstituted phenols. However, in the case of synthesizing bis-(hydroxyphenyl) methanes; i.e., where R and $R_1$ in the above structural formula are both hydrogen, difficulty is encountered unless only one of the three available condensation points of the phenol (ortho, ortho and para) is not substituted. For example, in the synthesis of p,p'-dihydroxydiphenyl methane, the condensation of phenol and formaldehyde presents many difficulties and results in an inferior product due to the formation of polysubstituted and even polymeric products. Therefore, in order to synthesize bis-(hydroxyphenyl) methanes for use in producing polymeric grade polycarbonates a different process must be used.

The most direct synthesis of the valuable bis-(hydroxyphenyl) methanes is by the reduction of the dihydroxyphenone which process has the added advantage that in the production of p,p'-dihydroxydiphenyl methane the corresponding ketone (p,p'-dihydroxybenzophenone) is readily available. Heretofore, attempts to reduce the carbonyl group of the ketone to a methylene group have employed chemical reduction methods. Although these methods are successful for benzophenone itself, they lead to poor yields of impure product with the dihydroxybenzophenones. Thus, an attempt by H. L. Bradlow and C. A. Von der Werf, reported in the J. Am. Chemical Soc., 69, 1254 (1947), to utilize the Clemmensen method on p,p'-dihydroxybenzophenone gave only a 25% yield of p,p'-dihydroxydiphenylmethane. Also, although the Wolff-Kishner method has never been applied to a dihydroxybenzophenone an attempt by O. Grummett and A. Jenkins, reported in the J. Am. Chemical Soc., 68, 914 (1946), to apply this method to the similar p,p'-dichlorobenzophenone resulted in only a 21% yield of the corresponding reduced compound.

Now, in accordance with this invention, bis-(hydroxyphenyl) methanes may be produced directly from bis-(hydroxyphenyl) ketones in substantially quantitative yields by a process which comprises reacting bis-(hydroxyphenyl) ketones with hydrogen in the presence of a relatively small amount of palladium to produce the corresponding bis-(hydroxyphenyl) methane.

In carrying out this process the ketone and the catalyst are advantageously suspended and dispersed in a suitable liquid reaction medium and the hydrogen introduced into the reaction vessel. Although higher temperatures may be used to hasten the reaction, it has been found more advantageous to carry out the reaction at ambient or "room" temperature; that is, at between about 20° and 30° C. Reaction mediums which are inert to the reactants and are liquids at this temperature are numerous but in order that catalyst may be recovered from the mixture after the completion of the reaction the reaction medium should advantageously be a solvent for the reaction product. The recovery of the catalyst from the mixture may, of course, be accomplished by other means than by simple separation but greater advantages have been found from using a reaction medium which is a solvent for the reaction product at temperatures below the boiling point of the reaction medium.

The use of palladium as a catalyst for the reduction of aryl alkyl ketones as well as for benzophenone has been disclosed in the prior art, however, its use in the reduction of a bis-(hydroxyphenyl) ketone has never been suggested. In view of the very limited number of aryl ketone reductions, generally, that are catalyzed by palladium, it was surprising to find that the bis-(hydroxyphenyl) ketones were readily reduced in the presence of palladium to produce substantially quantitative yields of the corresponding bis-(hydroxyphenyl) methane. This is also particularly unexpected since many of the other commonly used catalysts such as platinum, ruthenium and the like are not nearly as effective and in some cases are even detrimental to the reaction in that hydrogenation of the ring takes place.

Although the palladium catalyst may be used in the form of a powder it is preferred to utilize the catalyst as finely divided particles deposited on an inert carrier such as carbon powder, pumice, asbestos, silica gel, alumina or the like in an amount between about 5% and 10% by weight of the carrier. The use of the catalyst deposited in this way; that is, on an inert carrier, finds particular advantages in this process beyond promoting its catalytic effectiveness by reason of the fact that such a relatively small amount of catalyst is needed and yet its expensive nature makes its recovery desirable. That is, generally, it has been found advantageous to use only between about 0.05% and 5% by weight of palladium based on the weight of the ketone depending upon the rate of reaction desired. Although the higher the concentration of catalyst, the more rapidly the reaction proceeds, in the practice of this process greater advantages accrue from using catalyst concentrations within the limits stated.

In carrying out reactions of this type wherein one of the reacting components is a gas such as hydrogen, which is used here, it is common practice to introduce the gas to the reaction vessel under pressure. As the reaction proceeds, the pressure on the reaction vessel decreases until the reaction is complete which is readily determinable by the pressure on the vessel reaching and maintaining a constant final pressure lower than the initial pressure. In the practice of this process, although the hydrogen pressure may be varied over a wide range, it has been found more advantageous to maintain the initial hydrogen pressure between about one and about five atmospheres.

The following example, in which parts and percent of materials are intended to mean parts and percent by weight, will further serve to illustrate and explain the invention although it is understood that the invention is not to be limited thereby.

*Example*

A 5% palladium catalyst is made up by depositing 0.3 parts of palladium on 6.0 parts of carbon powder. 3 parts of this 5% palladium catalyst are then added to 100 parts of a reaction medium of isopropanol containing 10.7 parts of p,p'-dihydroxybenzophenone. A stoichiometric excess of hydrogen is then introduced into the reaction vessel under 49.5 pounds per square inch pressure and the mixture is agitated until the pressure drops to 40.0 pounds per square inch and remains constant indicating the end of the reaction. The catalyst is then removed by filtering the solution and the filtrate is concentrated to about 25 parts.

An equal volume of water is then added to the concentrated solution and a white precipitate is formed which is filtered off from the solution. The white precipitate is recrystallized from water to give a 95% yield of p,p'-dihydroxyphenylmethane with a melting point of 161–2° C.

What is claimed is:

1. A process for preparing a bis-(hydroxyphenyl) methane which comprises reacting at ambient temperature a bis-(hydroxyphenyl) ketone with hydrogen under between about 1 and about 5 atmospheres pressure in the presence of a relatively small amount of palladium deposited on an inert carrier.

2. A process in accordance with claim 1 in which the amount of palladium present is between about 0.05% and 5% by weight on the weight of the ketone.

3. A process for the preparation of p,p'-dihydroxydiphenylmethane which comprises reacting at ambient temperature p,p'-dihydroxybenzophenone with hydrogen under between about 1 and about 5 atmospheres pressure in the presence of a relatively small amount of palladium.

References Cited in the file of this patent

UNITED STATES PATENTS

| 2,427,337 | Abbott et al. | Sept. 16, 1947 |
| 2,761,883 | Smith et al. | Sept. 4, 1956 |

FOREIGN PATENTS

| 613,016 | Great Britain | Nov. 22, 1948 |

OTHER REFERENCES

Levine et al., Jour. Organic Chem., vol. 22 (January 1957), pages 85, 86.